(12) United States Patent
Temirov et al.

(10) Patent No.: US 8,347,410 B2
(45) Date of Patent: Jan. 1, 2013

(54) METHOD FOR EXAMINING A SAMPLE

(75) Inventors: Ruslan Temirov, Cologne (DE); Sergey Subach, Aachen (DE); Frank Stefan Tautz, Bremen (DE)

(73) Assignee: Forschungszentrum Juelich GmbH, Juelich (DE)

( * ) Notice: Subject to any disclaimer, the term of this patent is extended or adjusted under 35 U.S.C. 154(b) by 302 days.

(21) Appl. No.: 12/734,492

(22) PCT Filed: Nov. 7, 2008

(86) PCT No.: PCT/EP2008/009391
§ 371 (c)(1),
(2), (4) Date: May 27, 2010

(87) PCT Pub. No.: WO2009/062631
PCT Pub. Date: May 22, 2009

(65) Prior Publication Data
US 2010/0263097 A1 Oct. 14, 2010

(30) Foreign Application Priority Data
Nov. 15, 2007 (EP) .................................... 07022154

(51) Int. Cl.
*G01Q 60/10* (2010.01)
(52) U.S. Cl. ................. 850/26; 250/311; 850/8
(58) Field of Classification Search ............ 850/26, 850/1
See application file for complete search history.

(56) References Cited

U.S. PATENT DOCUMENTS

| | | | | |
|---|---|---|---|---|
| 5,216,631 A | * | 6/1993 | Sliwa, Jr. .................... | 365/174 |
| 5,307,311 A | * | 4/1994 | Sliwa, Jr. .................... | 365/174 |
| 5,497,000 A | | 3/1996 | Tao et al. | |
| 2010/0257642 A1 | * | 10/2010 | Honbo et al. ................... | 850/1 |
| 2012/0151638 A1 | * | 6/2012 | Temirov et al. ................ | 850/26 |

OTHER PUBLICATIONS

Tersoff and Hamann (J. Tersoff and D.R. Hamann (Jan. 15, 1985). Physical Review B 31, 805). Theory of the scanning tunneling microscope AT & T Bell Laboratories, Murray Hill, New Jersey 07974 vol. 31, No. 2.
Stipe et al. (B.C. Stipe, M.A. Rezaei and W. Ho ( Jun. 12, 1998). Science—vol. 280, p. 1732-1735). Single-Molecule Vibrational Spectroscopy and Microscopy.
Qiu et al., (X.H. Qiu, G.V. Nazin and W. Ho (Jan. 24, 2003) Science—vol. 299, p. 542-546) Vibrationally Resolved Fluorescence Excited with Submolecular Precision.
Binning and Rohrer (G. Binning, H. Rohrer (1987). Reviews of Modern Physics, vol. 59, No. 3, Part I, Jul. 1987, p. 615-625). Scanning tunneling microscopy—from birth to adolescencer Gerd Binning and Heinrich Rohrer IBM Research Division, Zuerich Research Laboratory, 8803 Rueschlikon, Switzerland.
Mitsui T, et al.: "Coadsorption and interactions of O and H on Pd(111)", Surface Science Elsevier Netherlands, vol. 511, No. 1-3, Jun. 10, 2002, pp. 259-266, XP002513426.

(Continued)

*Primary Examiner* — Nikita Wells
*Assistant Examiner* — Johnnie L Smith
(74) *Attorney, Agent, or Firm* — Jordan and Hamburg LLP

(57) ABSTRACT

Disclosed is a method for examining a sample using a scanning tunneling microscope, wherein before or during image recording, a contrast agent is applied to at least one location on the tip of the scanning tunneling microscope and/or on the sample, which is part of the tunneling contact during the image recording, while a temperature less than or equal to the condensation temperature of the contrast agent is set at this location. A corresponding scanning tunneling microscope is disclosed.

8 Claims, 2 Drawing Sheets

OTHER PUBLICATIONS

Rasmussen P B et al.: "The Reactor STM: A scanning tunneling microscope for investigation of catalytic surfaces at semi-industrial reaction conditions", Review of Scientific Instruments, AIP, Melville, NY, US, vol. 69, No. 11, Nov. 1, 1998, pp. 3879-3884, XP012036120.

Parker M-C et al.: "Hydrogen bonding molecules and their effect on scanning tunneling microscope image contrast of covalently immobilized protein molecules" Journal of Vacuum Science & Technologyb (Microelectronics and Nanometer Structures) AIP for American Vacuum Soc USA, vol. 14, No. 2, Mar. 1996, pp. 1432-1437, XP002513428.

Noll J D et al.: "Flow Injection System for the Scanning Tunneling Microscope" Review of Scientific Instruments, AIP, Melville, NY, US, vol. 66, No. 8, Aug. 1, 1995, pp. 4150-4156, XP000525610.

Deng Z T et al.: "Selective analysis of molecular states by functionalized scanning tunneling microscopy tips", Physical Review Letters APS USA, Vo. 96, No. 15, Apr. 21, 2006, pp. 156102/1-156102/4, XP002513429.

Coombs J H et al.: "Properties of vacuum tunneling currents: anomalous barrier heights", IBM Journal of Research and Development USA, vol. 30, No. 5, Sep. 1986, pp. 455-459, XP001329902.

Wilms M et al.: "A new and sophisticated electrochemical scanning tunneling microscope design for the investigation of potentiodynamic processes", Review of Scientific Instruments, AIP, Melville, NY, US, Vo. 70, No. 9, Sep. 1, 1999, pp. 3641-3650, XP012037650.

Gupta J A et al.: "Strongly coverage-dependent excitations of adsorbed molecular hydrogen", Physical Review B (Condensed Matter and Materials Physics) APS Thourgh AIP USA, vol. 71, No. 11, Mar. 15, 2005, pp. 115416-1-115416-5, XP002513427.

Temirov R et al.: "A novel me hod achieving utlra-high geometrical resolution in scanning tunnelling microscopy", New Journal of Physics, Institute of Physics Publishing, Bristol, GB, Vo. 10, No. 5, May 1, 2008, p. 53012, XP 020137768.

\* cited by examiner

METHOD FOR EXAMINING A SAMPLE

BACKGROUND OF THE INVENTION

The invention relates to a method for examining a sample.

Imaging the surface of a sample using a scanning tunneling microscope (STM) is known from Binnig and Rohrer (G. Binnig, H. Rohrer (1987). Reviews of Modern Physics 59, 615).

The theory of scanning tunneling microscopy is known. During measurement with a scanning tunneling microscope, an electrically conductive tip or needle of the microscope is systematically moved in a grid pattern over the examination object, which is likewise conductive. The tip and the object surface are not in electrical contact during this process and, due to the insulating medium therebetween, e.g. air or vacuum, no current flow takes place in the macroscopic gap. However, if the tip approaches the surface at atomic orders of magnitude, the quantum mechanical states of the electrons (orbitals) of the surface and of the tip are superposed on one another, so that an exchange of electrons takes place with a probability greater than zero, which leads to a tunneling current by means of a tunneling effect, when a low voltage is applied. This tunneling current is highly sensitive to the smallest changes in distance, since the intensity is inversely exponentially proportional to the distance.

Various measurement modes for scanning tunneling microscopy are known. In the case of measurement at a constant height, the height of the tip is kept constant and the tunneling current varies in the course of scanning. This mode allows rapid scanning of the surface, but with an increased risk of breakage of the needle resulting from large changes in the structure of the sample. In a measurement mode with a constant tunneling current, the tunneling current is kept constant by a control circuit and the tip follows the surface. The resolution is high in this method, with the electronic structure of the surface being imaged on an atomic scale.

It is known from Tersoff and Hamann (J. Tersoff and D. R. Hamann (1985). Physical Review B 31, 805) that, by means of scanning tunneling microscopy, the local density of states (LDOS) in the region of the valence electrons is imaged, which is chemically unspecific, with structures that can extend over several atoms.

There have been various attempts to further provide the scanning tunneling microscope with a chemical sensitivity. For instance, the use of the inelastic tunneling process as a possibility for local, spatially resolved vibrational spectroscopy is known from Stipe et al. (B. C. Stipe, M. A. Rezaei and W. Ho (1998). Science 280, 1732).

The use of the optical luminescence properties of molecules or nanostructures for the spectroscopic identification thereof is known from Qiu et al. (X. H. Qiu, G. V. Nazin and W. Ho (2003) Science 299, 542).

Disadvantageously, none of these known methods allow for atomic-geometric/chemical imaging of the surface structure for a sufficiently diverse range of samples. Regardless of the measurement mode, conventional scanning tunneling microscopy only allows imaging of the chemical, or of the atomic-geometric structure of an examination object in special cases.

Another disadvantage of scanning tunneling microscopy is the lack of chemical sensitivity. This is to say that the method does not allow for identification of chemical species, and thus while it is possible to image molecular objects and surface structures to less than one angstrom in the lateral size range, it is usually not possible to identify them chemically or in any other way. The scanning tunneling microscope therefore does not give a clearly identifiable fingerprint of an adsorbed molecular object or of atomic surface structures. The reason for this shortcoming is the known conventional imaging mechanism of the scanning tunneling microscope.

SUMMARY OF THE INVENTION

An object of the invention is to provide an improved method for examining a sample using a scanning tunneling microscope, which allows for atomic-geometric chemical imaging of the structures for as many different samples as possible. Another object of the invention is to provide an improved scanning tunneling microscope for examining a sample.

The method for examining a sample using a scanning tunneling microscope is characterized in that, before or during image recording, a contrast agent is applied to at least one location on the tip of the scanning tunneling microscope, and/or on the sample, which is part of the tunneling contact during the image recording, while a temperature that is less than or equal to the condensation temperature of the contrast agent is set at this location.

This method advantageously allows atomic-geometric imaging of chemical structures using scanning tunneling microscopy, for the first time. The atomic-geometric imaging takes place with unprecedented high sensitivity and resolution. This therefore gives the scanning tunneling microscope a previously unattainable structural and chemical sensitivity. The identification of the atomic-geometric structure, and thus, the chemical structure of molecular objects and atomic surface structures of other objects constitutes the direct subject matter of the invention. The method advantageously allows identification of nanoscale objects based on their atomic-geometric and thus chemical structure.

DESCRIPTION OF THE PREFERRED EMBODIMENTS

Figure 1:
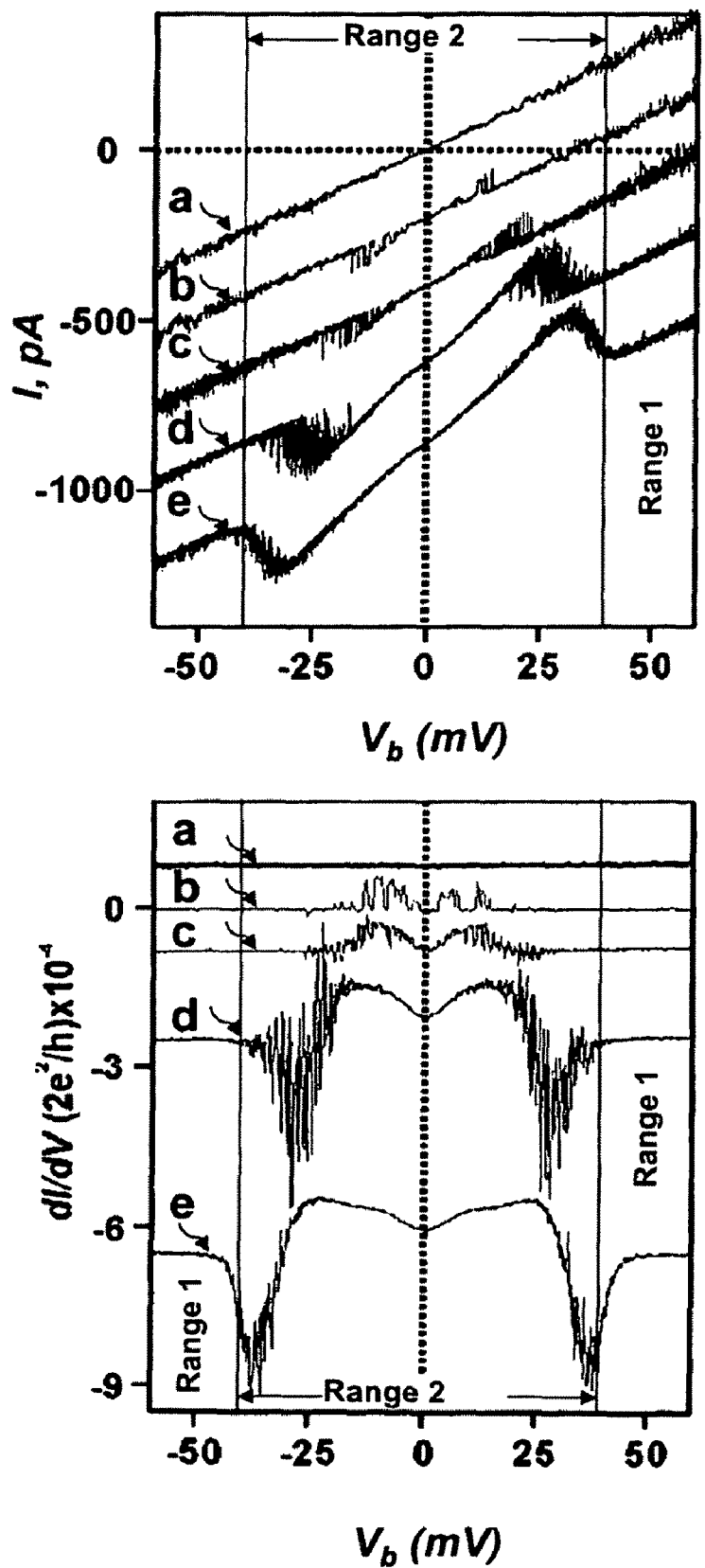
FIG. 1 shows curves before and after the I/U curve and the dI/dU change.

In one embodiment of the invention, a gaseous contrast agent is applied during the method. Particular advantageously, this means that the contrast agent can be applied with particular ease to at least one location on the tip of the scanning tunneling microscope and/or the sample, which is part of the tunneling contact during the image recording.

For example, hydrogen ($H_2$), or deuterium ($D_2$), or tritium ($T_2$), or HD (hydrogen deuterium), or HT (hydrogen tritium), or DT (deuterium tritium), or helium (He) or another gas, preferably a gas having a low atomic weight, may be chosen as the contrast agent. The quantum properties of light gases advantageously switch the conductance of the tunneling contact during scanning of the sample with high contrast. It is conceivable to apply a mixture consisting of a number of these aforementioned gas species.

Neon, $O_2$, CO, $NO_x$, $N_2$, $N_2O$, $CO_2$ and molecules of similar structure are also conceivable as contrast agents.

It has been found in the context of the invention that the use of these gases, or of another gas, preferably a gas which has a low atomic weight, as the contrast agent in scanning tunneling microscopy makes it possible for the atomic-geometric chemical structure of the sample to become apparent.

When use is made of a tunneling contact modified with hydrogen or another suitable gas, preferably in a low-temperature scanning tunneling microscope, the gas advantageously condenses in the tunneling contact of the microscope, and the contrast agent effect, which makes it possible to see the atomic-geometric chemical structure of the examination object, rather than the local density of states (LDOS) which has been the heretofore known electronic scanning tunneling microscope contrast, develops at this point. This new type of contrast will also be referred to below as Scanning Tunneling Hydrogen Microscopy contrast, abbreviated to STHM contrast. The tip of the microscope is sensitized by the contrast agent during the method.

The optimal dosing quantity of the contrast agent used, that is to say the quantity of substance to be provided which leads to the best possible atomic-geometric chemical STHM contrast, depends on the microscope used, the metering device used and the environment surrounding the two, i.e. any cooling shields that may be present, the (vacuum) chamber, and the like. This need only be determined once for the microscope, whereafter it will provide reliable results for the set-up in question in further experiments.

In the simplest case, the environment surrounding the microscope, e.g. the vacuum chamber, is flooded with a gaseous contrast agent.

The optimal values for the tunneling voltage U and the tunneling current I (constant current mode), or for the tunneling voltage U and the tunneling distance d (constant height mode) for STHM, depend on the microscope, the tunneling tip and the sample. Any value for U and I which allows for conventional electronic STM images can also be used as a starting value for the STHM method according to the invention. If optimized values are known for a certain combination of microscope, tunneling tip and sample, scanning in the STHM mode can be started directly with these values.

The concentration of the gas in the region of the tunneling contact can be adjusted as the measurements progress. It can be selected to be low.

In particular, a condensed object may be selected as the sample.

The image recordings which take place thereafter have a contrast which shows the atomic-geometric chemical structure of the sample. In this way, highly diverse objects and surface structures can be identified on the basis of their atomic-geometric chemical structure.

Particularly when starting the method, images and I/U curves as well as spectra, which is to say dI/dU or higher derivatives of the tunneling current I according to the tunneling voltage U as a function of U, are recorded over a period of time. Particularly advantageously, this means that it is possible to decide, based on the images, curves and spectra, when, due to the addition of the contrast agent, the properties of the tunneling contact have changed to such an extent that the atomic-geometric chemical structure is visible, instead of the local density of states.

In particular, images with improved contrast are recorded when non-linearities, e.g. zero bias anomaly and negative differential conductance (cf. FIG. 1), occur in the I/U curves, in a manner distributed symmetrically around the tunneling voltage 0 mV. Based on the non-linearities, the tunneling contact is confirmed to be in a state that allows for atomic-geometric chemical contrast for the sample. Reliable indicators of the tunneling contact state that allows for scanning tunneling microscopy according to the invention are sharp, downwardly pointing peaks of negative differential conductance, which appear in the dI/dU spectra, in a manner distributed symmetrically around the tunneling voltage 0 mV, or the zero bias anomaly, i.e. a decrease (as in FIG. 1) or increase in conductance toward the tunneling voltage 0 mV. The tunneling voltages $U_{NDC}$ (ndc=negative differential conductance) at which the peaks of negative differential conductance occur vary, in particular, between approximately 10 and 50 mV, and in other cases, up to 100 mV and above. For certain tunneling distances d, the peaks may also point upward.

The method is advantageously performed when the tunneling contact, as a function of the tunneling voltage U, is either in a state of low conductivity (range 1, see FIG. 1) or in a state of high conductivity (range 2). Advantageously, by way of the set tunneling voltage, this switches back-and-forth between the local density of states and the atomic-geometric chemical contrast, so that the electronic, and the atomic-geometric structure of one and the same examination object are congruently measured.

In a further, particularly advantageous embodiment of the invention, the images are recorded at a low tunneling voltage of approximately −100 mV to approximately +100 mV. The atomic-geometric chemical contrast is particularly clear in this voltage range.

For recording the images, either the constant current mode or the constant height mode is selected. Depending on the requirements of the experiment, both conventional modes, with their known advantages, may be used.

The images can also be optimized by way of the geometry of the tunneling tip used in the method. Furthermore, the images can also be optimized on the basis of the I/U curves and on the basis of the dI/dU spectra.

Images can also be recorded using the known spectroscopic imaging mode of scanning tunneling microscopy, i.e. the imaging of derivatives of the tunneling current I according to the tunneling voltage U.

A scanning tunneling microscope for carrying out the method comprises a supply line for a contrast agent in the region of the tip and/or in the region of the sample holder. This advantageously means that the contrast agent can be introduced and applied directly in the region of the tunneling contact, without possible undesired effects occurring in other regions or locations.

By means of a supply line, and in particular a heatable capillary tube with a nozzle, the contrast agent can be brought to the nozzle in gaseous form, and will not condense until it is in the direct vicinity of the sample or tip. Alternatively, the contrast agent in the capillary can be frozen and can be introduced into the tip region in very precise doses by way of controlled heating.

The microscope is advantageously configured as a low-temperature scanning tunneling microscope at the outlet opening of the supply line or capillary tube. As a result, advantageously, only the directly required region of the overall test arrangement or microscope is cooled. Cryostats and other suitable means for locally producing a temperature below the condensation temperature of the employed contrast agent are provided as the cooling means.

The invention will be described below with reference to exemplary embodiments and the appended drawings, without this being intended to limit the concept of the invention.

First Exemplary Embodiment

In a low-temperature scanning tunneling microscope having a base temperature below the condensation temperature of the gas used as the contrast agent, the tunneling tip is brought into tunneling contact with the surface by a coarse movement of the microscope toward the latter, and is optionally pulled back again for the subsequent step by means of the z-piezoceramic.

By means of a suitable apparatus, the gas is introduced in gaseous form into the tunneling contact, so that it starts to condense on the cold surfaces of the tunneling microscope until, after a time $t_1$ from the start of the gas supply, it finally changes the properties of the tunneling contact in such a way that STHM images with the above-described atomic-geometric chemical contrast can be recorded. After a time $t_1+\Delta$ (where $0 \leq \Delta \ll t_1$), the supply of gas into the tunneling contact is ended.

In order to determine this time $t_1$, the following method is applied:

(1) The tip is brought into tunneling contact with the surface by the z-piezoceramic at the set tunneling voltage U, until the tunneling current reaches the set nominal value I. The pair of values (U, I) defines a certain distance d of the tip from the sample (tunneling distance). This depends on the properties of the sample, the tip and the lateral position of the tip above the sample.

(2) The feedback loop is opened.

(3) I/U curves or dI/dU spectra in the range of approximately U=−100 mV to 100 mV are recorded at a suitable time interval of a few seconds to minutes with a constant tip distance. During this time, gas can continue to condense on the cold surfaces of the scanning tunneling microscope.

After the time $t_1$, the I/U curve and the dI/dU spectrum change. This indicates a change in the tunneling contact. Typical curves and spectra before and after the change are shown in FIG. 1.

Reliable indicators of the state of the tunneling contact which allows the STHM contrast are the sharp, downwardly pointing peaks of negative differential conductance, which appear in the dI/dU spectra in a manner distributed symmetrically around the tunneling voltage 0 mV. The tunneling voltages $U_{NDC}$ at which they occur vary between approximately 10 and 50 mV, and in rare cases up to 100 mV and above. For certain tunneling distances d, the peaks may also point upward.

Following the change in the I/U curves and the dI/dU spectra, STHM images can be recorded. For this purpose, the tip is scanned laterally over the sample at a low tunneling voltage U.

Two STM operating modes can be used: the constant current mode and the constant height mode.

STHM images exhibit a contrast (see FIG. 2) which is different from the conventional STM. In order to optimize the STHM images, as is also customary in STM, it is then possible to vary the tunneling voltage U and the nominal current value I, in the constant current mode, or the tunneling voltage U and the tunneling distance d in the constant height mode, so as to obtain an optimal imaging result for the specific sample and tip, and for the specific microscope. Another parameter which can be used to optimize STHM images is the geometry of the tunneling tip. The optimization of the STHM images can also further change the I/U curves and the dI/dU spectra.

STHM images can also be recorded using the known method, referred to as spectroscopic imaging of the derivatives of the tunneling current I according to the tunneling voltage U.

If the chemical and atomic-geometric contrast of the STHM and the characteristic I/U curves and dI/dU spectra of the STHM are lost, the chemical and atomic-geometric STHM contrast together with the characteristic I/U curves and dI/dU spectra of the STHM can be reestablished, within a time period of seconds to minutes, simply by further scanning the sample surface. If both do not reappear spontaneously, gas can again be metered into the tunneling contact.

If the chemical and atomic-geometric STHM contrast is lost but the characteristic I/U curves and dI/dU spectra of the STHM remain, the atomic-geometric chemical STHM contrast can be recovered by optimizing the tunneling tip geometry.

By changing the tunneling voltage U, it is possible to switch back and forth as often as desired between the electronic STM contrast and the atomic-geometric chemical STHM contrast. For tunneling voltages U where $-|U_{NDC}|<U<|U_{NDC}|$ (range 2), STHM images are observed, wherein the clearest atomic-geometric chemical STHM contrast is observed at tunneling voltages $U \approx 0$ where $|U| \ll |U_{NDC}|$. In the range $-|U_{NDC}|<U<|U_{NDC}|$ where $U \neq 0$ und $|U| \leq \approx |U_{NDC}|$, the images may contain substantial additional information about the sample surface. For tunneling voltages $U<-|U_{NDC}|$ or $U>|U_{NDC}|$ (range 1), conventional images of the electronic STM contrast (LDOS) are observed. Switching the tunneling voltage U between ranges 1 and 2 allows for direct comparison of the atomic-geometric chemical, and the electronic structure of the same sample surface. Images of the electronic as well as of the atomic-geometric chemical structure can also be recorded in parallel by switching the tunneling voltage U between ranges 1 and 2 at each image point.

The optimal dosing quantity for the gas used, that is to say the quantity of substance to be provided which leads to the best possible atomic-geometric chemical STHM contrast, depends on the microscope used, on the metering device used and on the environment surrounding the two, e.g. any cooling shields, vacuum chambers and the like that may be present. These need only be determined once, whereafter reliable results are provided for the set-up in question in further experiments.

The values of the tunneling voltage U and of the tunneling current I (constant current mode) or of the tunneling voltage U and of the tunneling distance d, which are optimal for STHM depend on the microscope, the tunneling tip and the sample. Any value for U and I which allows for conventional electronic STM images can be used as a starting value for STHM. If optimized values are known for a certain combination of microscope, tunneling tip and sample, scanning in the STHM mode can be started directly with these values.

Second and Third Exemplary Embodiments

FIG. 1 and FIG. 2

These exemplary embodiments involve the method according to the first embodiment. In addition:

An ultrahigh-vacuum low-temperature scanning tunneling microscope with $^4$He bath cryostats and two closed cooling shields, made by Createc, was used. This comprises an outer cooling shield at 77 K and an inner cooling shield at 4.2 K in an ultrahigh-vacuum chamber.

As the metering device, use was made of a gas inlet with a manually operated metering valve on the ultrahigh-vacuum chamber, in which the cooling shields and the microscope are located.

The tip was pulled back by means of the z-piezoceramic, so that the gas valve could be actuated without causing a tip crash as a result of mechanical vibration during actuation. If actuation of the valve is sure not lead to any mechanical disruption, the tip can alternatively be left in the tunneling contact during the next step.

During the metering process, the pumps on the ultrahigh-vacuum chamber were switched off.

The metering valve was opened to the degree at which the pressure measured in the ultrahigh-vacuum chamber rises to the value p. During the metering process, flaps having a diameter of approximately 5 mm in both cooling shields were opened, so that the gas could flow to the microscope unhindered. The metering valve was closed immediately after the time $t_1$.

After closing the metering valve, the tunneling tip was brought into tunneling contact with the sample by means of the z-piezoceramic.

For FIG. 1, the Following Applies in Particular:

$p=6.4\times10^{-9}$ mbar, $t_1=6.5$ h. Hydrogen ($H_2$) was used as the gas. The sample is PTCDA/Ag(111). PTCDA is 3,4,9,10-perylenetetracarboxylic dianhydride.

The curves in the top panel of FIG. 1 are shifted vertically downward on the Y-axis by the following values: curve a=0 pA, curve b=200 pA, curve c=400 pA, curve d=600 pA, curve e=800 pA. The dI/dU spectra, which are likewise offset, are shown in the bottom panel of FIG. 1. Spectra b to e are shifted vertically downward on the Y-axis. All the spectra b to e at bias voltages less than −50 mV and greater than +50 mV exhibit the value of the unshifted spectrum a in an unshifted manner.

The top curve a and the top spectrum a were recorded prior to the introduction of hydrogen. Curve b and spectrum b were recorded at the time $t_1$ (see above). Curve c and spectrum c were recorded at $t_1+22$ min. Curve d and spectrum d were recorded at $t_1+80$ min. Curve e and spectrum e were recorded at $t_1+14$ h. All the curves were recorded centrally above a PTCDA molecule. Before measuring the spectra, the tunneling tip was stabilized at U=−0.340 V, I=0.1 nA.

Figure 2:
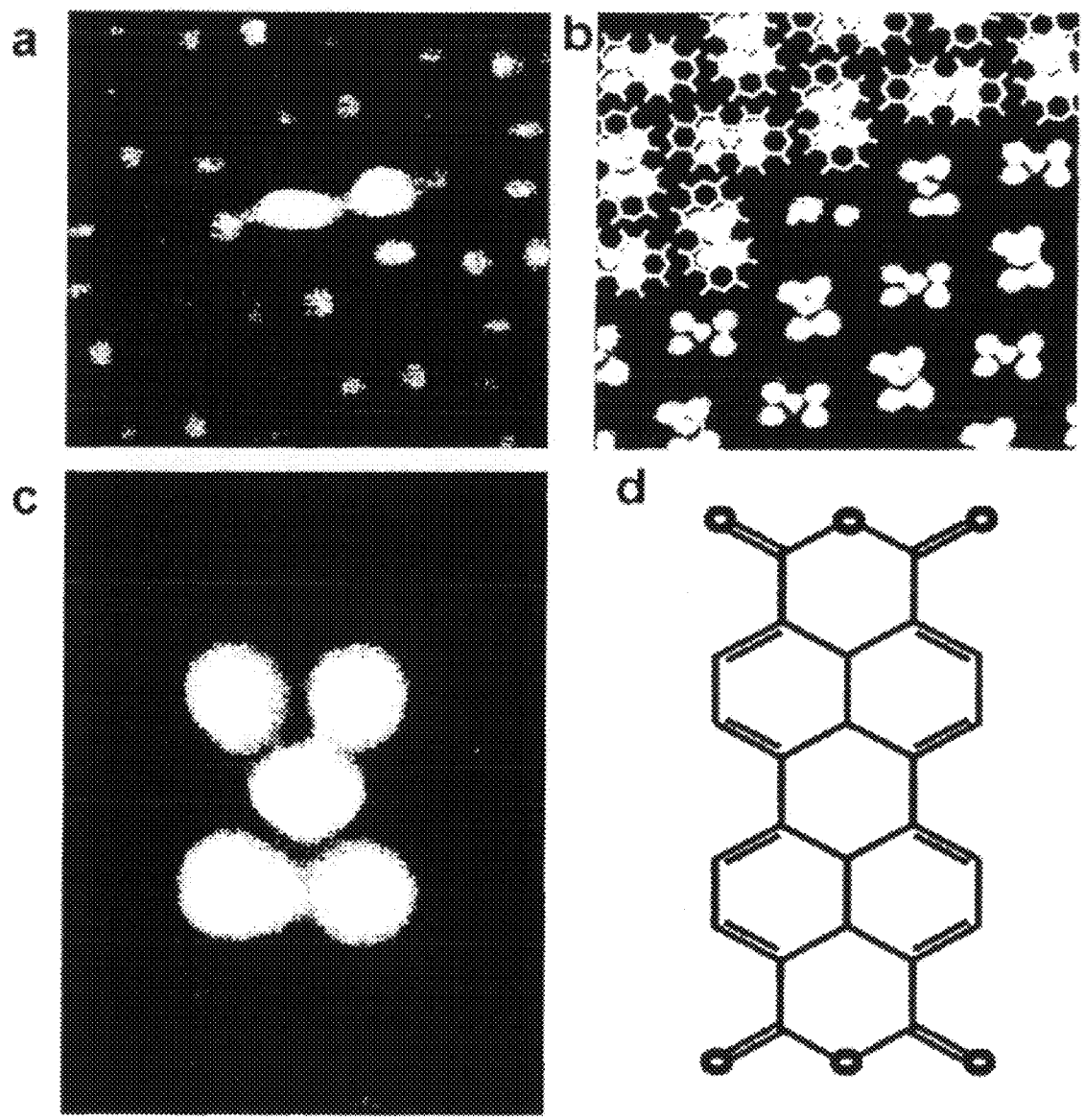
FIG. 2 shows the contrast of STHM images.

For FIG. 2, the Following Applies in Particular:

$p=3\times10^{-8}$ mbar, $t_1=1$ min. Deuterium ($D_2$) was used as the gas. The sample is PTCDA/Ag(111).

(a) 5×5 $nm^2$ constant current image with conventional electronic STM contrast, recorded with I=1 nA, U=−0.340 V.

(b) 5×5 $nm^2$ constant height dI/dV image of the sample surface from (a), recorded using the atomic-geometric chemical STHM contrast mode. Before recording the image, the tunneling tip was brought into tunneling contact with the sample surface at a tunneling voltage of U=−0.010 V and a tunneling current I=1 nA. The tunneling voltage during recording of the image was U=0 mV. The image was recorded using a lock-in amplifier (modulation amplitude 4 mV, modulation frequency 626 Hz). The calculated atomic structure of PTCDA/Ag (111) is overlaid in the top left corner.

(c) Enlarged detail from (b), 1×1.5 $nm^2$.

(d) Structural formula of the imaged PTCDA molecules.

It is conceivable that a switch which generates the indicated non-linearities is sufficient to allow the atomic-geometric chemical STHM contrast even without any contrast agent.

The invention claimed is:

1. A method for examining a sample using a scanning tunneling microscope, comprising effecting image recording, before or during image recording, applying a contrast agent to at least one location on the tip of the scanning tunneling microscope and/or on the sample, which is part of the tunneling contact during the image recording, and providing a temperature less than or equal to the condensation temperature of the contrast agent at said at least one location, wherein the atomic-geometric chemical structure of the sample emerges by choosing neon, $O_2$, CO, $NO_x$, $N_2$, $N_2O$, $CO_2$, hydrogen ($H_2$), deuterium ($D_2$), tritium ($T_2$), HD (hydrogen deuterium), HT (hydrogen tritium), DT (deuterium tritium) or helium (He) as the contrast agent.

2. The method according to claim 1, comprising using a gaseous contrast agent.

3. The method of using hydrogen ($H_2$), or deuterium ($D_2$), or tritium ($T_2$), or HD (hydrogen deuterium), or HT (hydrogen tritium), or DT (deuterium tritium), or helium (He) as a contrast agent in scanning tunneling microscopy, and using the contrast agent at a temperature below its condensation temperature.

4. The method according to claim 1 comprising recording, over a period of time, images and I/U curves and/or spectra corresponding to dI/dU, or higher derivatives of the tunneling current I according to the tunneling voltage U.

5. The method according to claim 1 comprising recording images when non-linearities occur in the I/U curves in a manner distributed symmetrically around the tunneling voltage 0 mV.

6. The method according to claim 1 comprising recording simultaneously images with an atomic-geometric chemical contrast and with an electronic contrast.

7. The method according to claim 1 comprising recording images at a low tunneling voltage of approximately −100 mV to approximately +100 mV.

8. The method case according to claim 7 comprising recording image at a low tunneling voltage of approximately −50 mV to approximately +50 mV.

* * * * *